(No Model.) P. BLANKENSOP, Jr.
MOLD FOR GLASSWARE.

No. 486,392. Patented Nov. 15, 1892.

WITNESSES.

INVENTOR.

Peter Blankensop Jr
by W. Bakewell Sons
his attorneys (No Model.) 2 Sheets—Sheet 2.
P. BLANKENSOP, Jr.
MOLD FOR GLASSWARE.
No. 486,392. Patented Nov. 15, 1892.
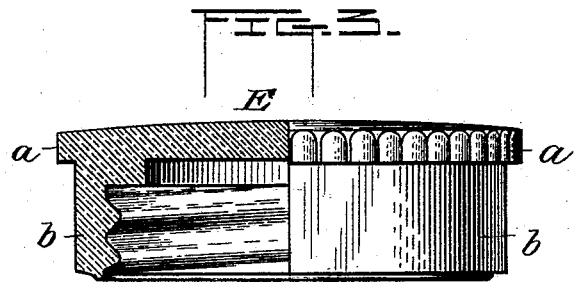
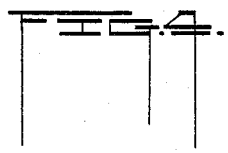
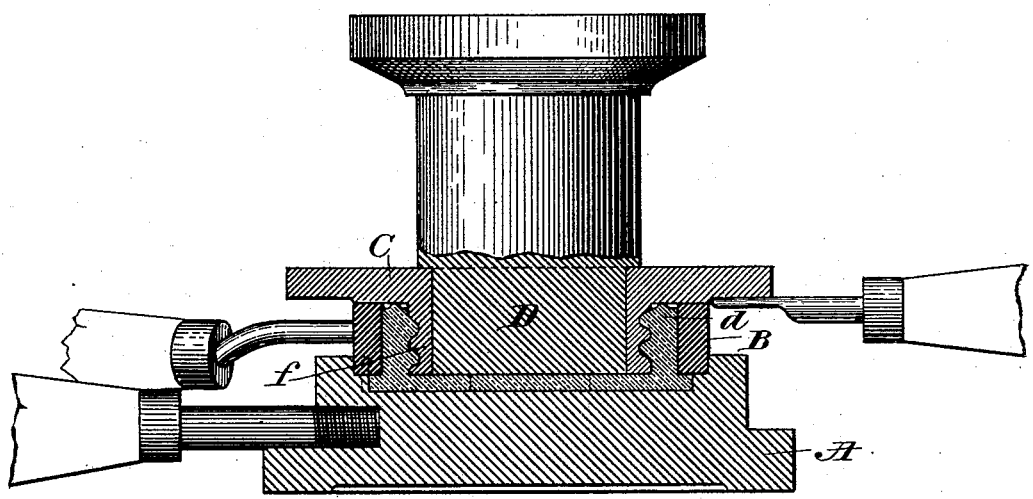
Witnesses
C. Byrnes
H. M. Corwin
Inventor
Peter Blankensop, jr.
by W. Bakewell & Sons
his Attorney

UNITED STATES PATENT OFFICE.

PETER BLANKENSOP, JR., OF WELLSBURG, WEST VIRGINIA, ASSIGNOR OF ONE-HALF TO LUCAS WALTER, OF SAME PLACE.

MOLD FOR GLASSWARE.

SPECIFICATION forming part of Letters Patent No. 486,392, dated November 15, 1892.

Application filed December 19, 1891. Serial No. 415,609. (No model.)

*To all whom it may concern:*

Be it known that I, PETER BLANKENSOP, Jr., of Wellsburg, in the county of Brooke and State of West Virginia, have invented a new and useful Improvement in Molds for Glassware, of which the following is a full, clear, and exact description.

My improvement is designed specially to overcome the practical difficulty in removing the screw-threaded plunger from the article of glassware after it is pressed and delivering the pressed article from the mold, which difficulty has not, so far as I know, been heretofore successfully obviated.

Figure 1:
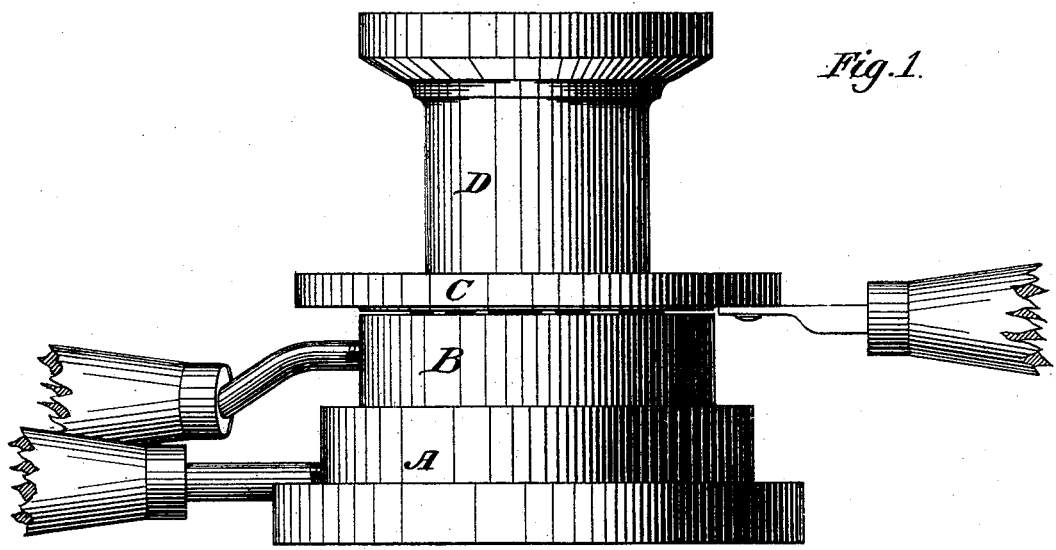
Figure 2:
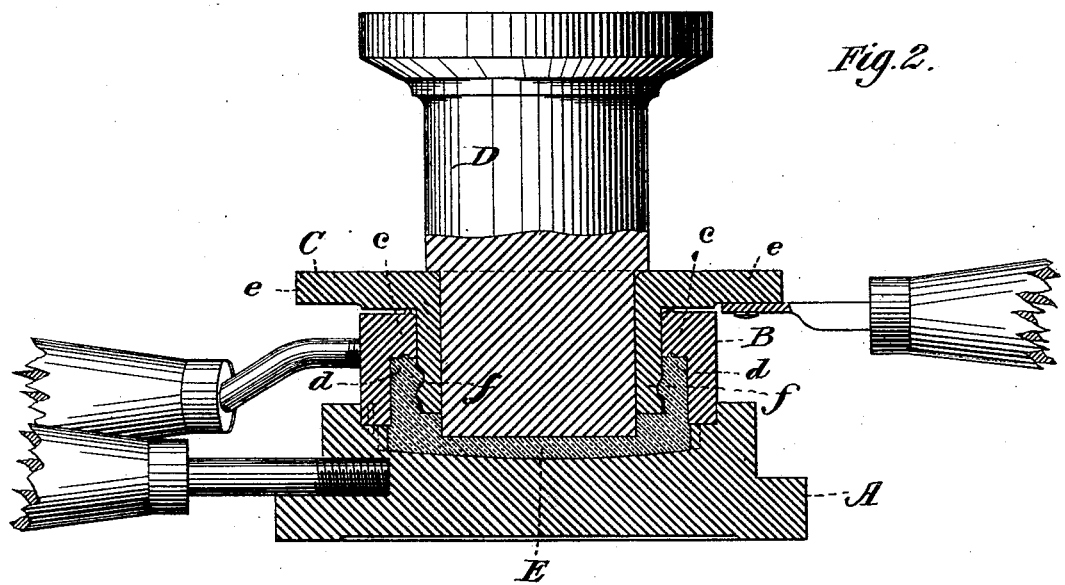

In illustration of my invention the accompanying drawings show, in Figure 1, a side view of my improved mold with the several parts in place after the article of glassware has been pressed therein; in Fig. 2, a vertical cross-section through the axis of the mold of Fig. 1; in Fig. 3, a finished article of glassware internally screw-threaded as it comes from the mold shown in the preceding figures; in Fig. 4, a modification of construction of parts of the mold.

I have illustrated my invention by a mold so shaped as to form a glass screw-cap, Fig. 3, adapted to be screwed onto a vessel of glass or other material, having external screw-threads on the neck or upper part of the vessel. It may, however, with obvious modifications of construction, be employed for making other articles—such as jelly-glasses, &c.—having an internal screw-thread into which an externally-threaded cap or a stopper of cork or other material is to be inserted.

My mold consists of four operative parts—viz., the base of the mold A, the mold-ring B, the screw-ring C, and the plunger D. The base of the mold has a cavity large enough to receive the mold-ring B, as shown in Fig. 2, and may have, if desired, an extension of that cavity, in which may be pressed the upper part *a* of the cap E when it is made to extend beyond the neck *b*, or is of shape other than circular. This modification is shown in Fig. 4, and will be readily understood without further explanation.

The mold-ring or false mold B is made to fit into the cavity of the mold-base A, and may be circular or of polygonal shape both externally and internally. If circular externally, it is prevented from turning on its axis by a pin and slot—one on the base A and the other in the mold-ring B—or by other suitable means. I prefer to make the mold-ring B with a flange *c*, (see Fig. 2,) projecting internally sufficiently far to form the edge of the collar *d* of the glass cap, so that the glass may not be twisted or distorted in removing the ring-mold B from the base A, and so that the ring C may not be raised by the pressure of the plunger on the glass; but this flange may be dispensed with, as shown in Fig. 4, in which case the upper edge of the inverted cap will be formed, as shown in Fig. 4, by the under surface of the screw-ring C, which would have to be held down to its place.

The screw-ring C is an annular female die having a flange *e*, which extends over or onto the top of the ring-mold B, that part *f* which enters the cavity of the ring-mold B having projecting screw-threads the counterpart of the screw-threads to be formed in the inside of the collar of the glass cap E. The central cavity or bore of this screw-ring C is cylindrical and of such diameter as to receive the cylindrical plunger D. The under side of the plunger D may be a plain surface, or may have any pattern or letters, formed either in cameo or intaglio, that may be desired to be impressed in the inner surface of the glass screw-cap.

The base-piece A of the mold is adapted to be set upon the glass-molding press, so as to be readily removed therefrom, the mold-ring B is placed in the cavity of the base A without being attached thereto, but only prevented from turning on its axis therein, and the screw-ring C is placed on or over the mold-ring B, so that the axial line of its cavity may be in line with that of the plunger D; but none of the parts are screwed or otherwise fastened together.

The operation of my improved mold is as follows: The base-piece A being set on the glass-press in proper position, the mold-ring B and screw-ring C are placed on it, as above described. A suitable quantity of molten glass is dropped into the cavity of the mold through the screw-ring C, and then the plunger D is lowered, which causes the glass to fill the cavity of the mold. The screw-cap, being thus formed, is readily removed from the mold. The screw-cap C is turned on its axis by its handle, so as to unscrew it from the glass cap, and the plunger D is raised out of the mold, preferably after the screw-ring C has been unscrewed, as then the plunger prevents any distortion of the screw-threads in the glass. The screw-ring C being also removed from the mold, the mold-ring B is also lifted off from the base-piece A and from the newly-formed glass cap therein, and, lastly, the base-piece A is removed from the press and inverted, when the finished cap readily drops out, and, the operation being complete, the parts are replaced for a repetition of the operation.

The advantage of my mold is its simplicity of construction, which enables the parts to be used without any screwing or other attachment of the pieces together, thus saving much time in use, and, chiefly, the ease with which the glass cap is removed from the mold without danger of distortion.

What I claim as my invention is—

1. In a glass-mold, the combination of the mold-base, the mold-ring seated therein, and the screw-ring having a projecting flange resting upon the mold-ring, a smooth cylindrical bearing therein, and external screw-threads below the same, substantially as described.

2. In a glass-mold, the combination of the mold-base, the mold-ring seated therein, the screw-ring having a central hole therethrough, an annular flange resting upon the mold-ring, a smooth cylindrical bearing therein and external screw-threads below the same, and a plunger arranged to reciprocate through the hole in the screw-ring, substantially as described.

In testimony whereof I have hereunto set my hand this 23d day of November, A. D. 1891.

PETER BLANKENSOP, Jr.

Witnesses:
G. W. FRESHWATERS,
H. C. HERVEY.